H. T. GOSS.
COUNTING AND RECORDING MECHANISM.
APPLICATION FILED OCT. 28, 1915.
1,228,315.
Patented May 29, 1917.
15 SHEETS—SHEET 1.
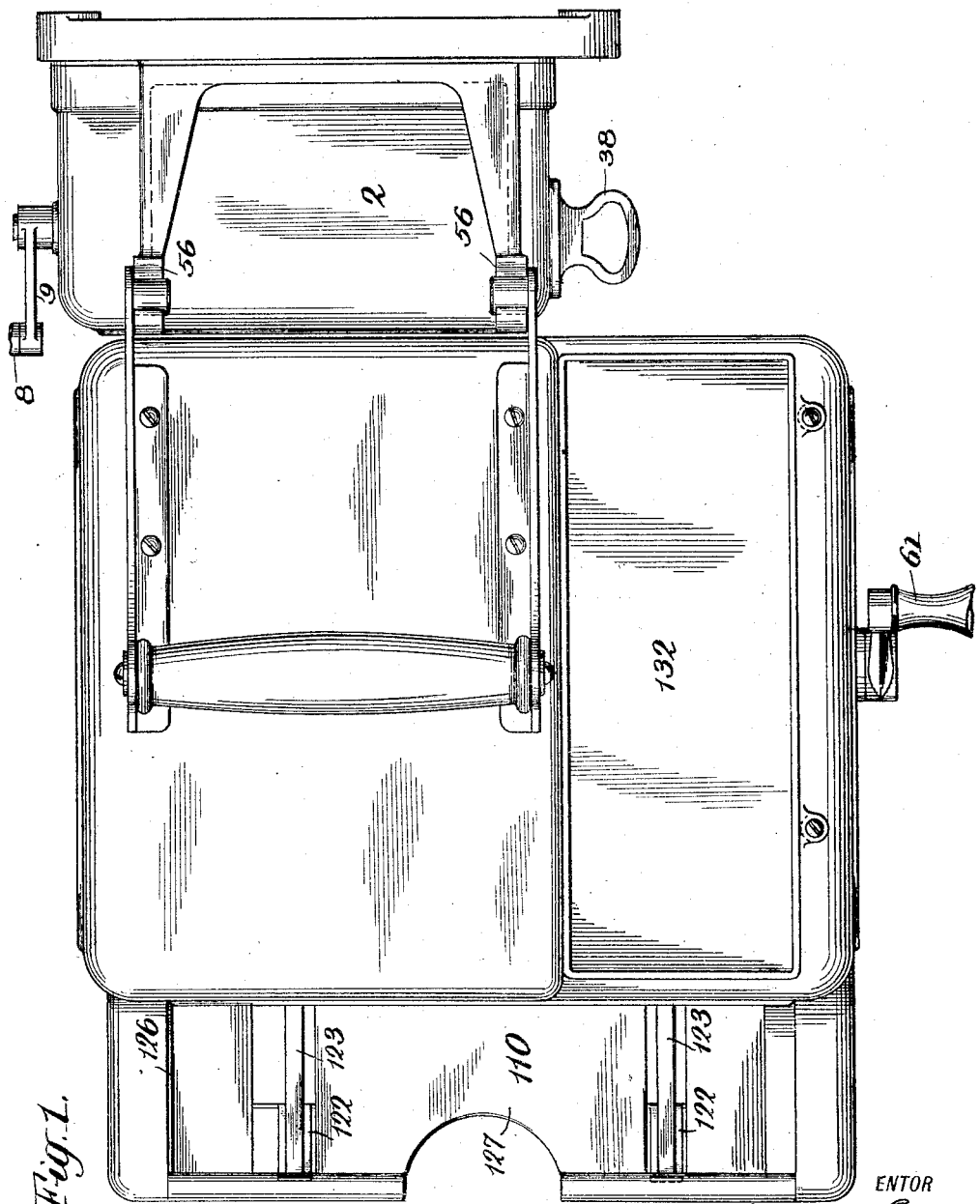

H. T. GOSS.
COUNTING AND RECORDING MECHANISM.
APPLICATION FILED OCT. 28, 1915.
1,228,315.
Patented May 29, 1917.
15 SHEETS—SHEET 2.
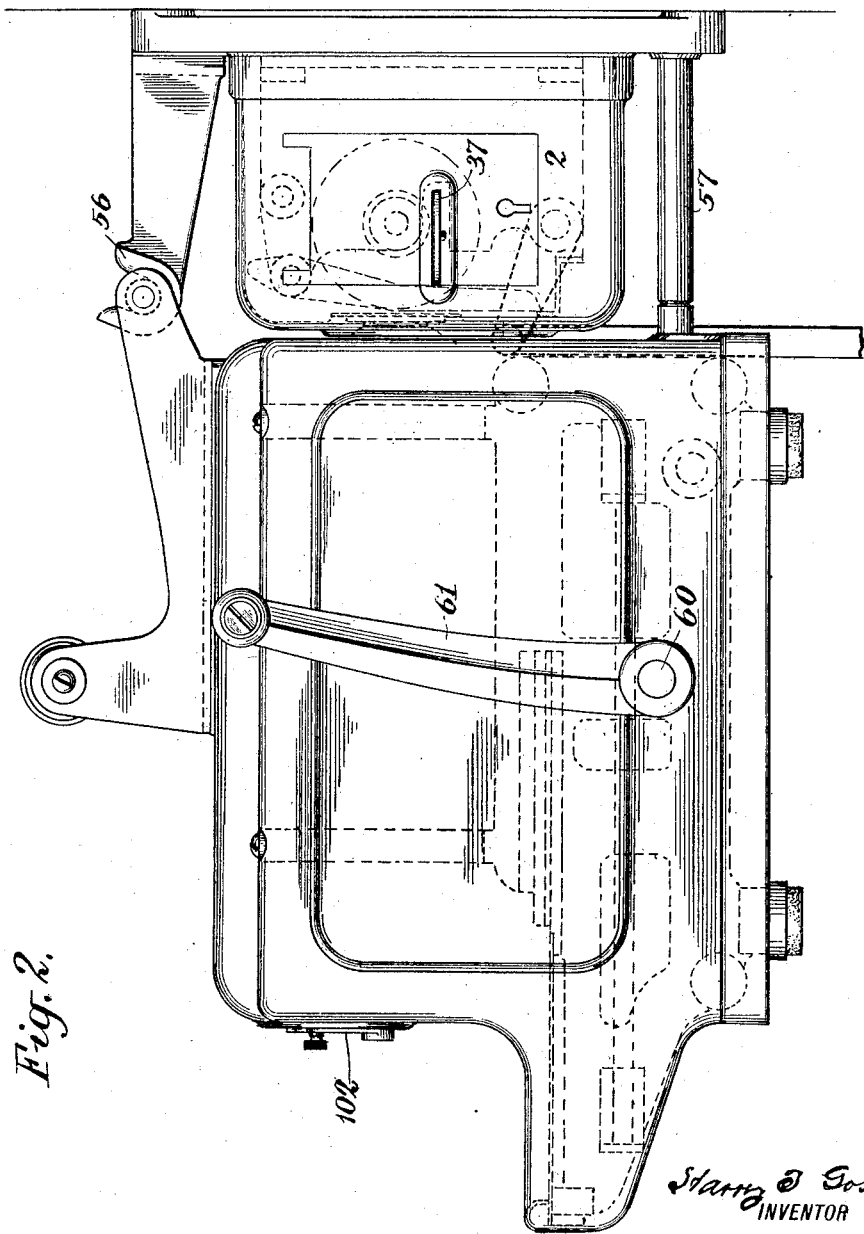

H. T. GOSS.
COUNTING AND RECORDING MECHANISM.
APPLICATION FILED OCT. 28, 1915.
1,228,315.
Patented May 29, 1917.
15 SHEETS—SHEET 3.
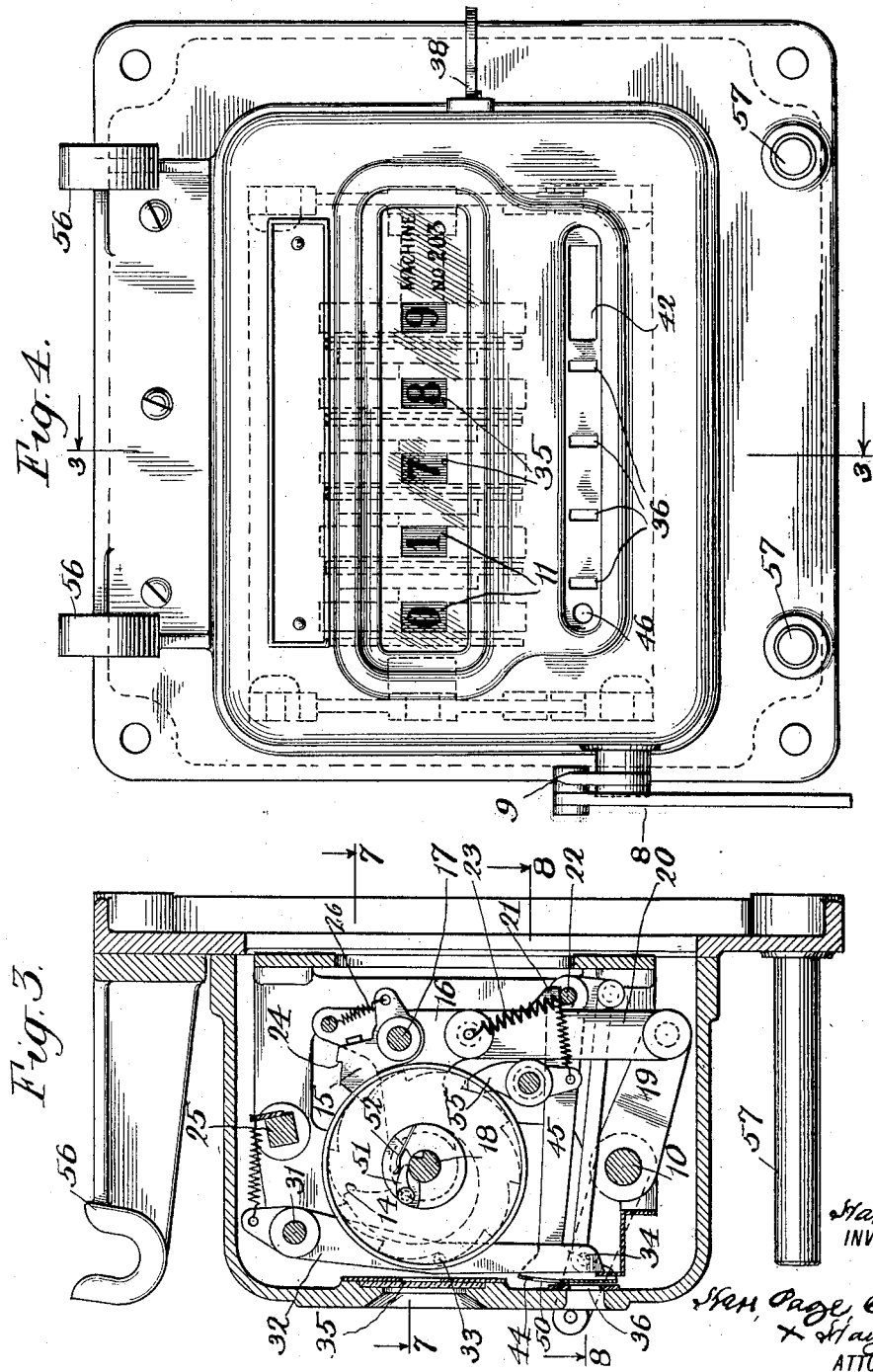

H. T. GOSS.
COUNTING AND RECORDING MECHANISM.
APPLICATION FILED OCT. 28, 1915.
1,228,315.
Patented May 29, 1917.
15 SHEETS—SHEET 4.
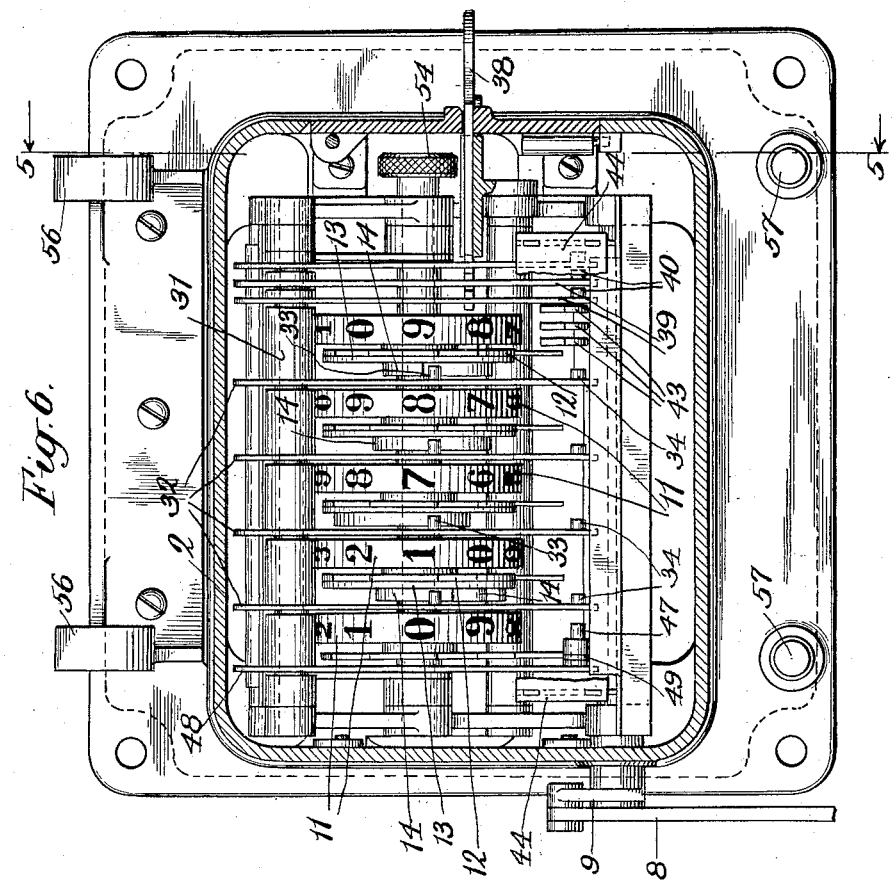

H. T. GOSS.
COUNTING AND RECORDING MECHANISM.
APPLICATION FILED OCT. 28, 1915.

1,228,315.

Patented May 29, 1917.
15 SHEETS—SHEET 5.

INVENTOR

BY
ATTORNEY

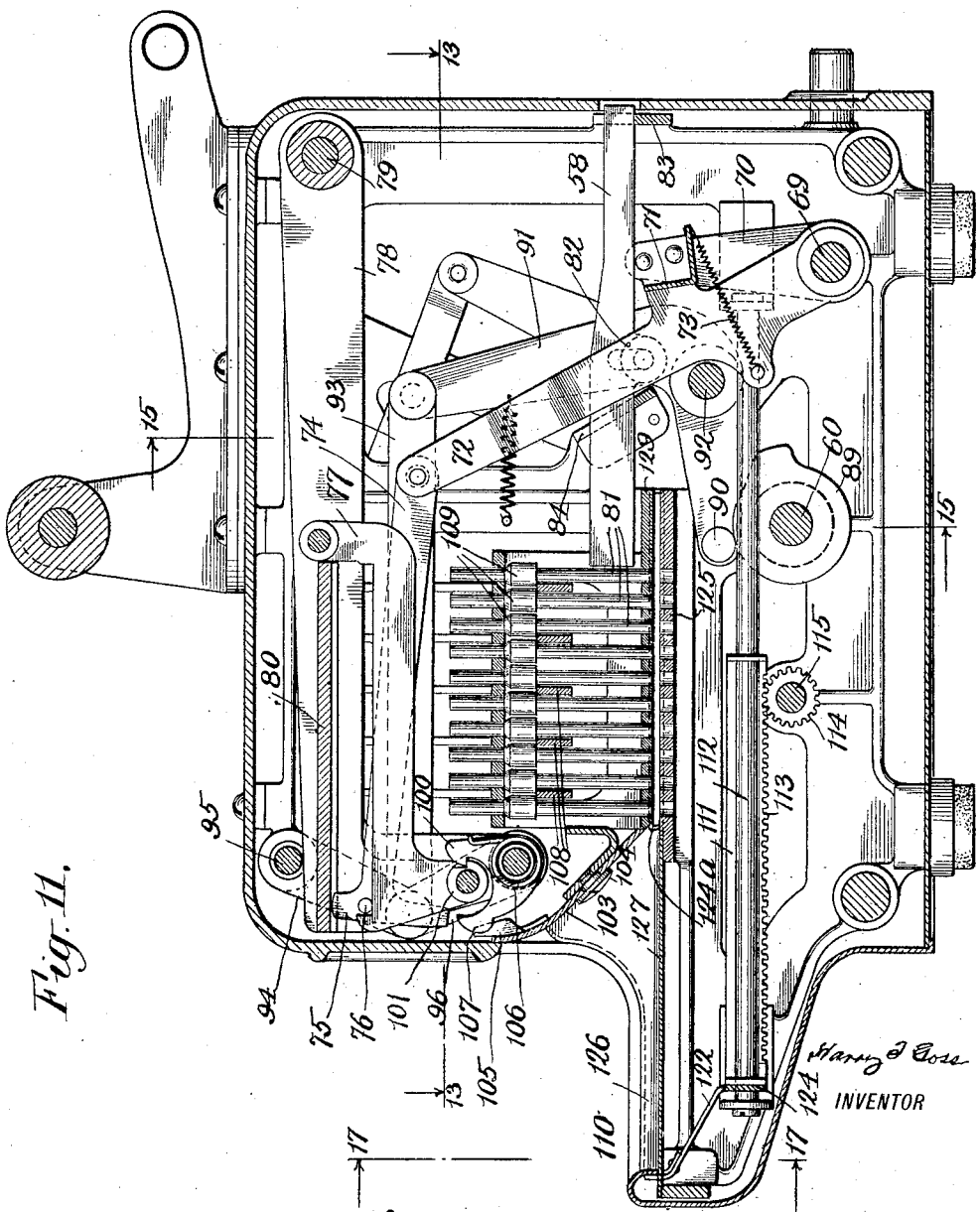

H. T. GOSS.
COUNTING AND RECORDING MECHANISM.
APPLICATION FILED OCT. 28, 1915.
1,228,315.
Patented May 29, 1917.
15 SHEETS—SHEET 7.
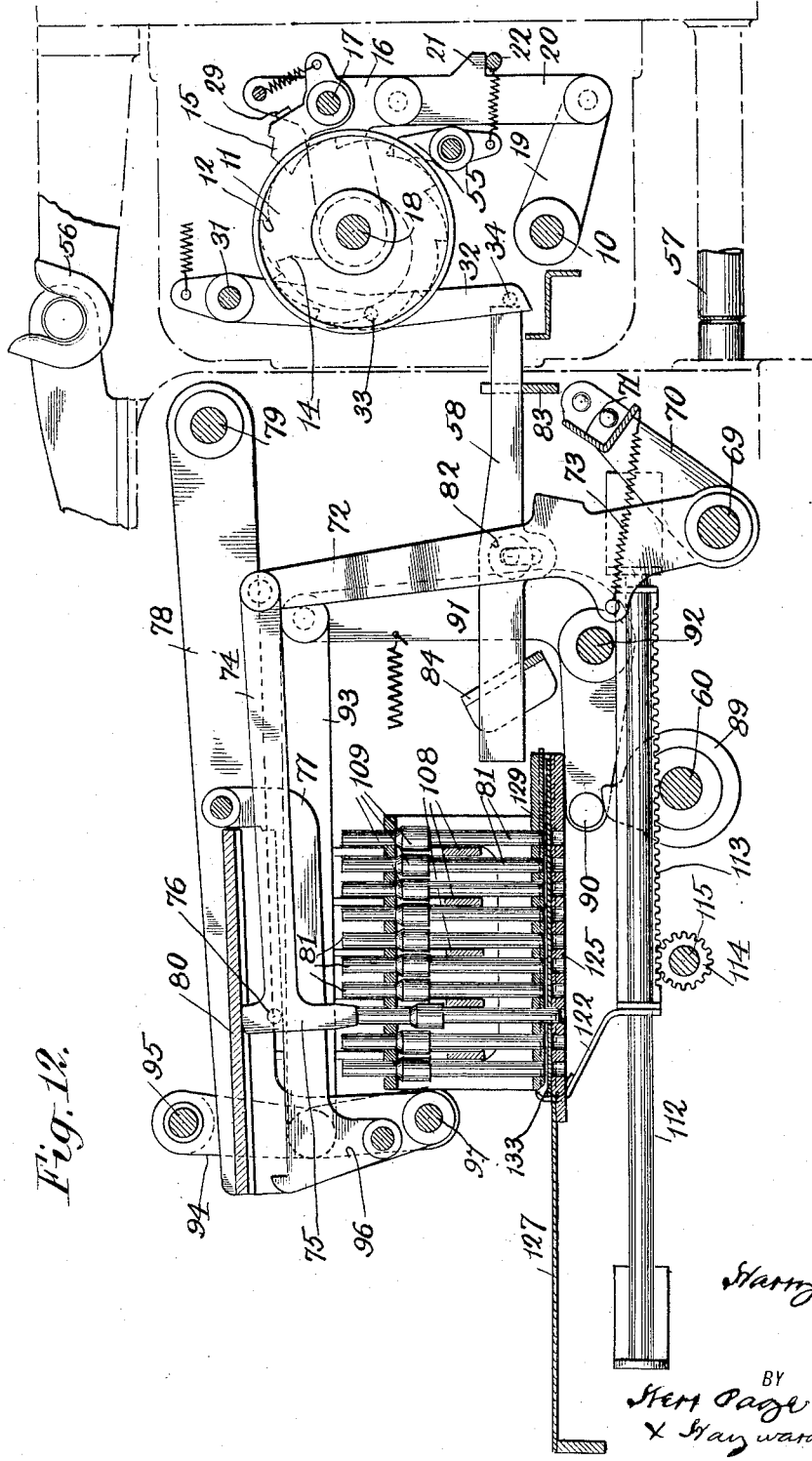

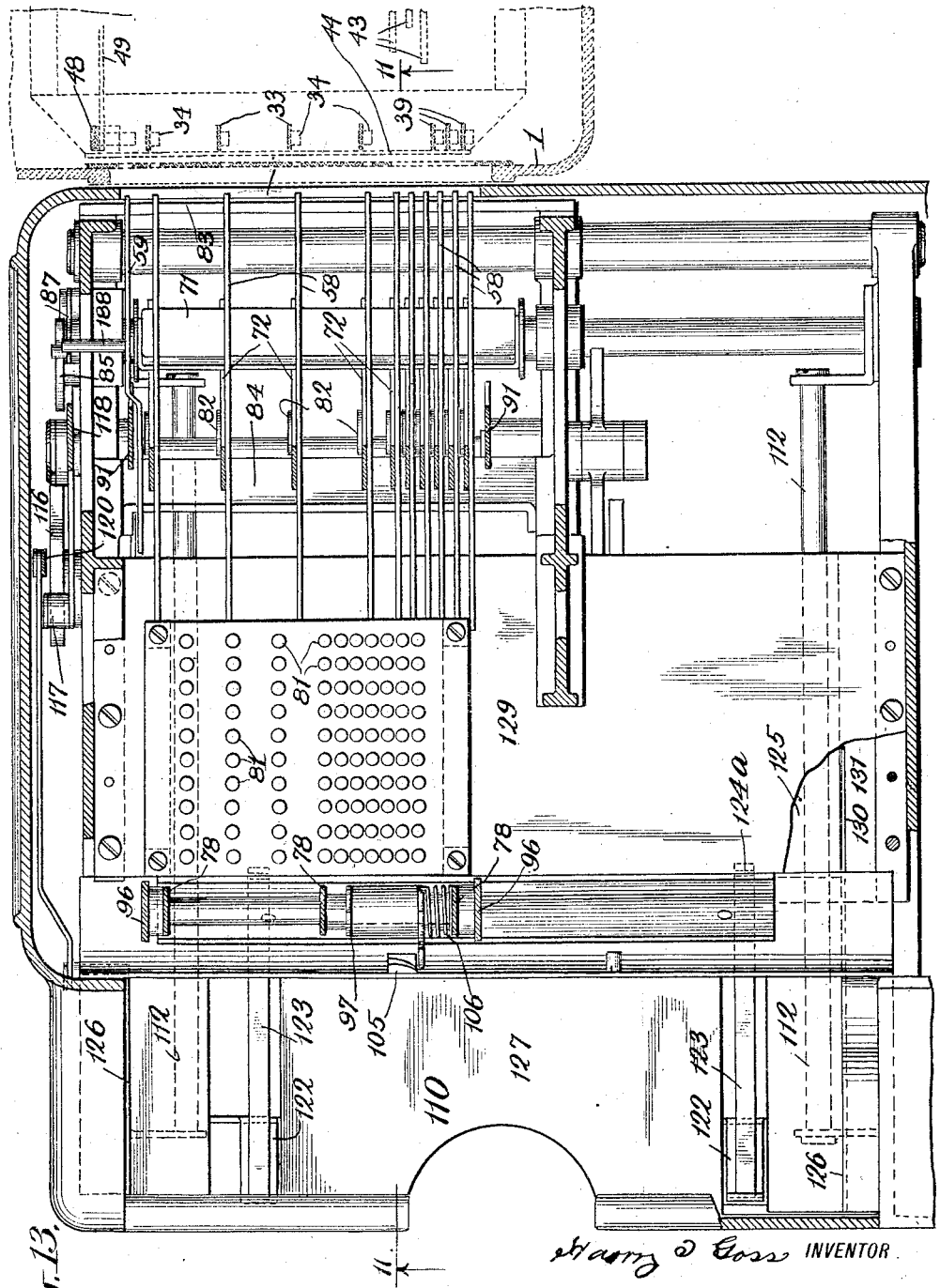

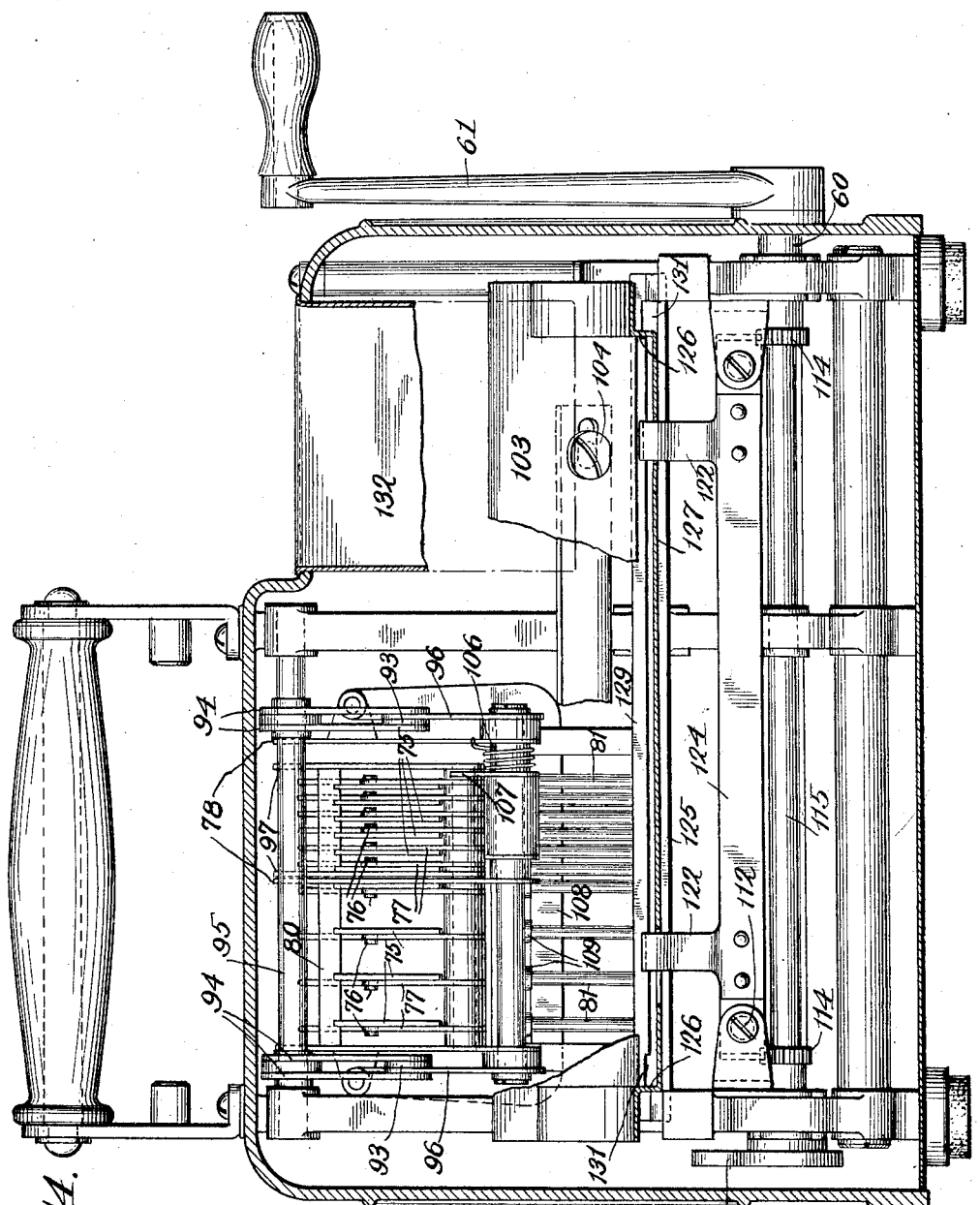

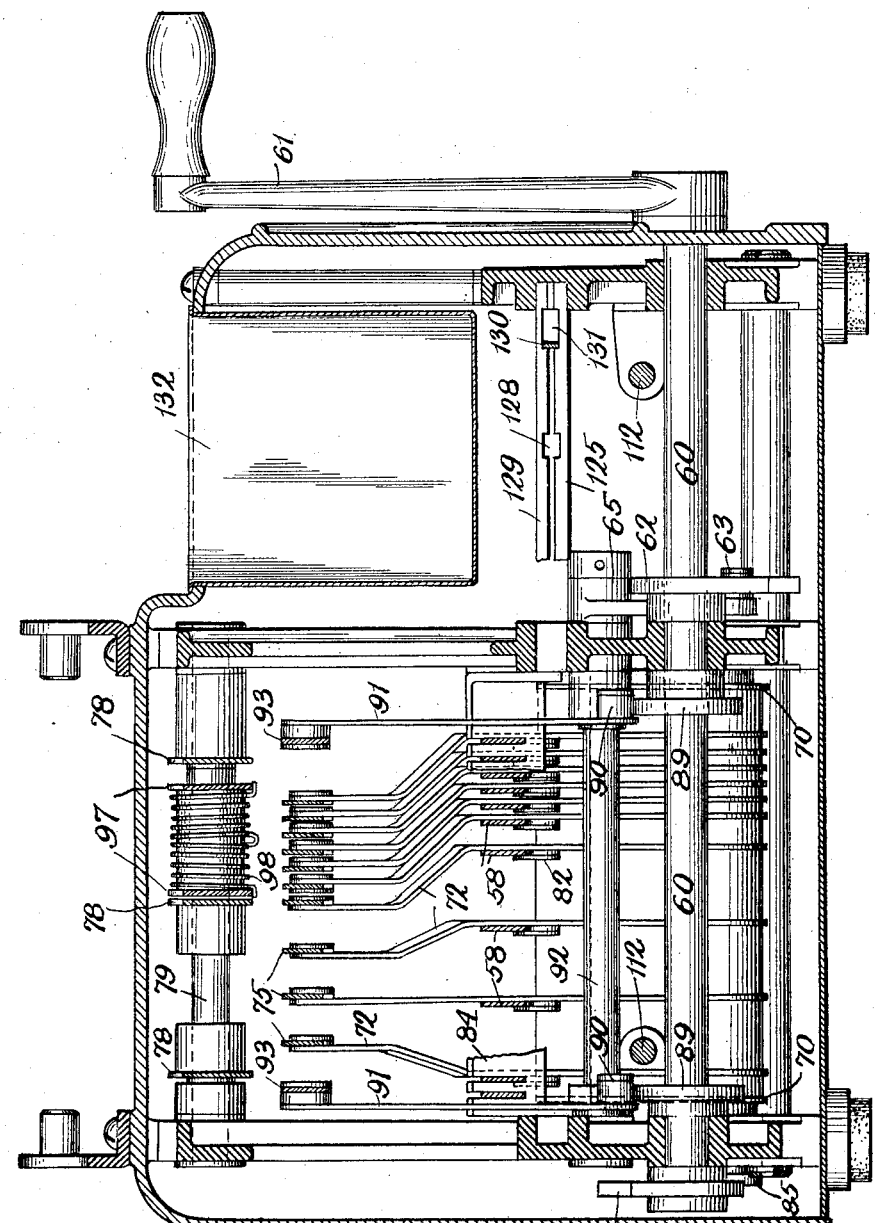

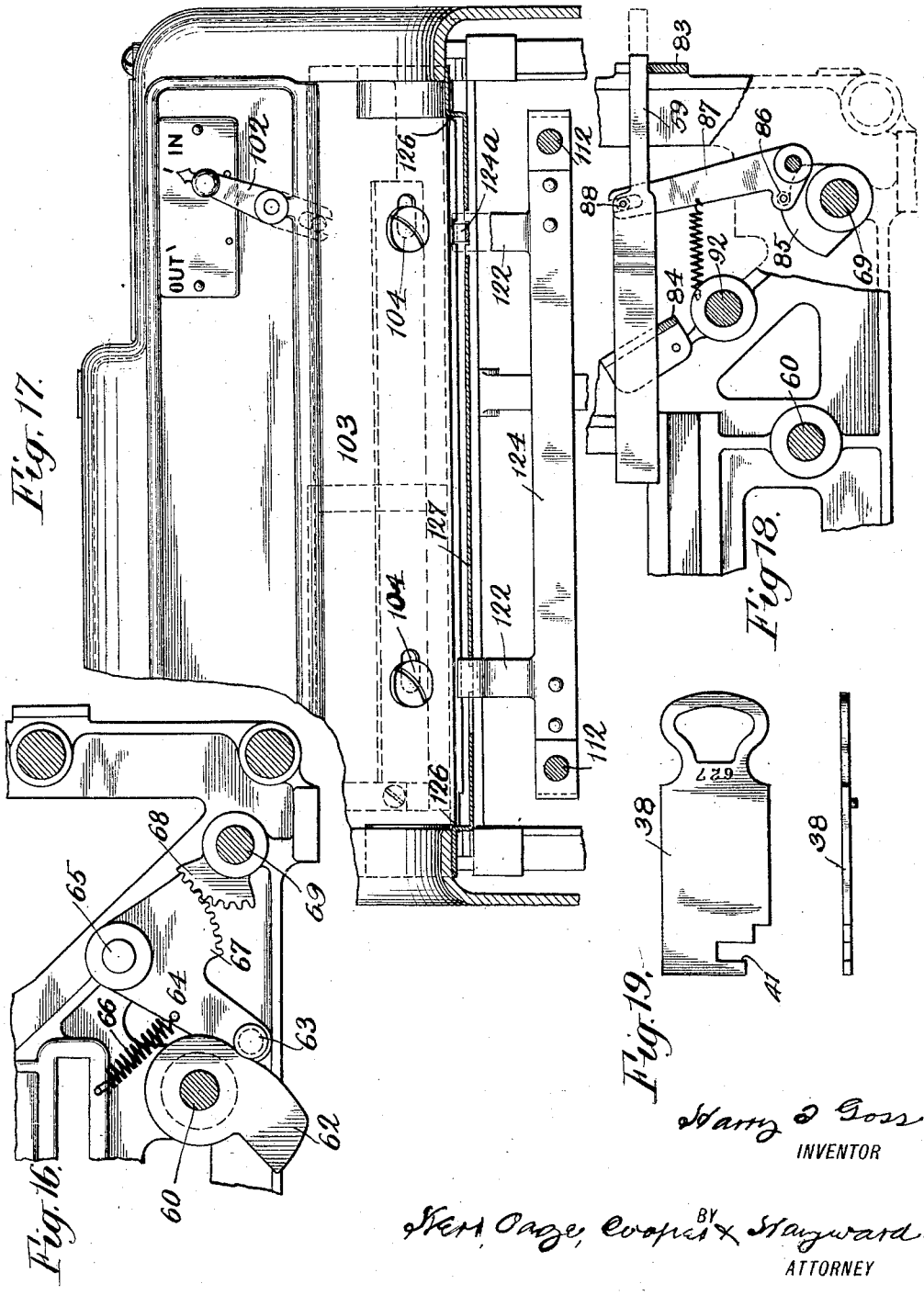

H. T. GOSS.
COUNTING AND RECORDING MECHANISM.
APPLICATION FILED OCT. 28, 1915.
1,228,315.
Patented May 29, 1917.
15 SHEETS—SHEET 12.
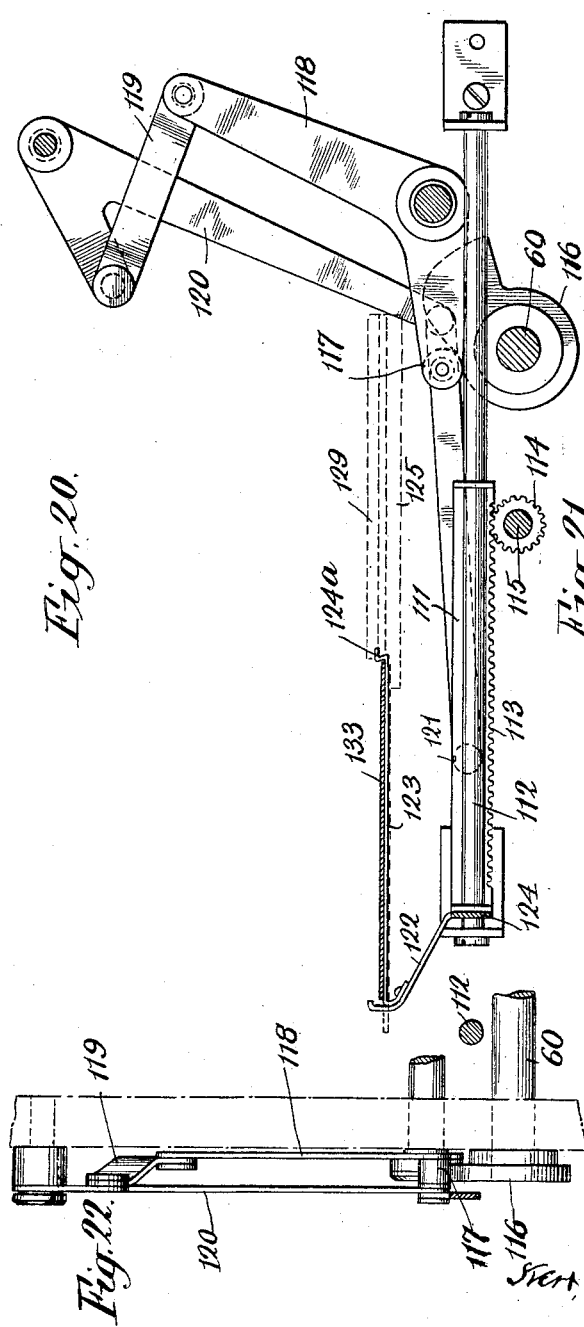
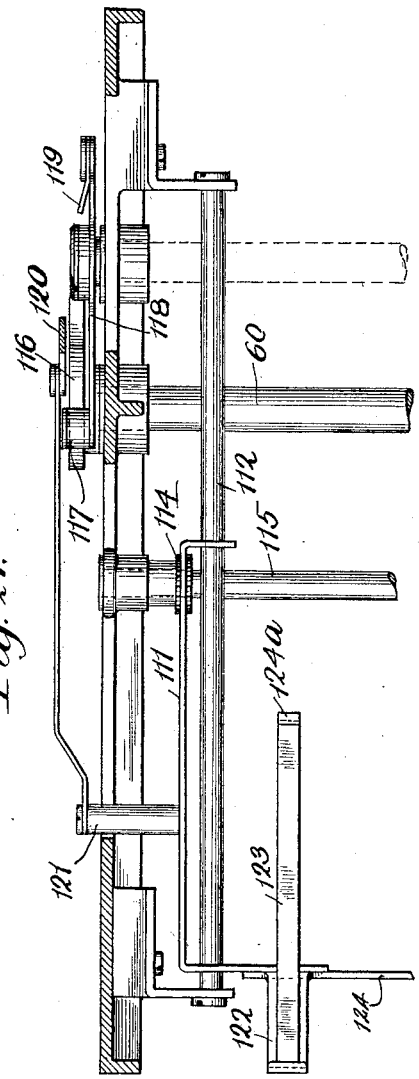

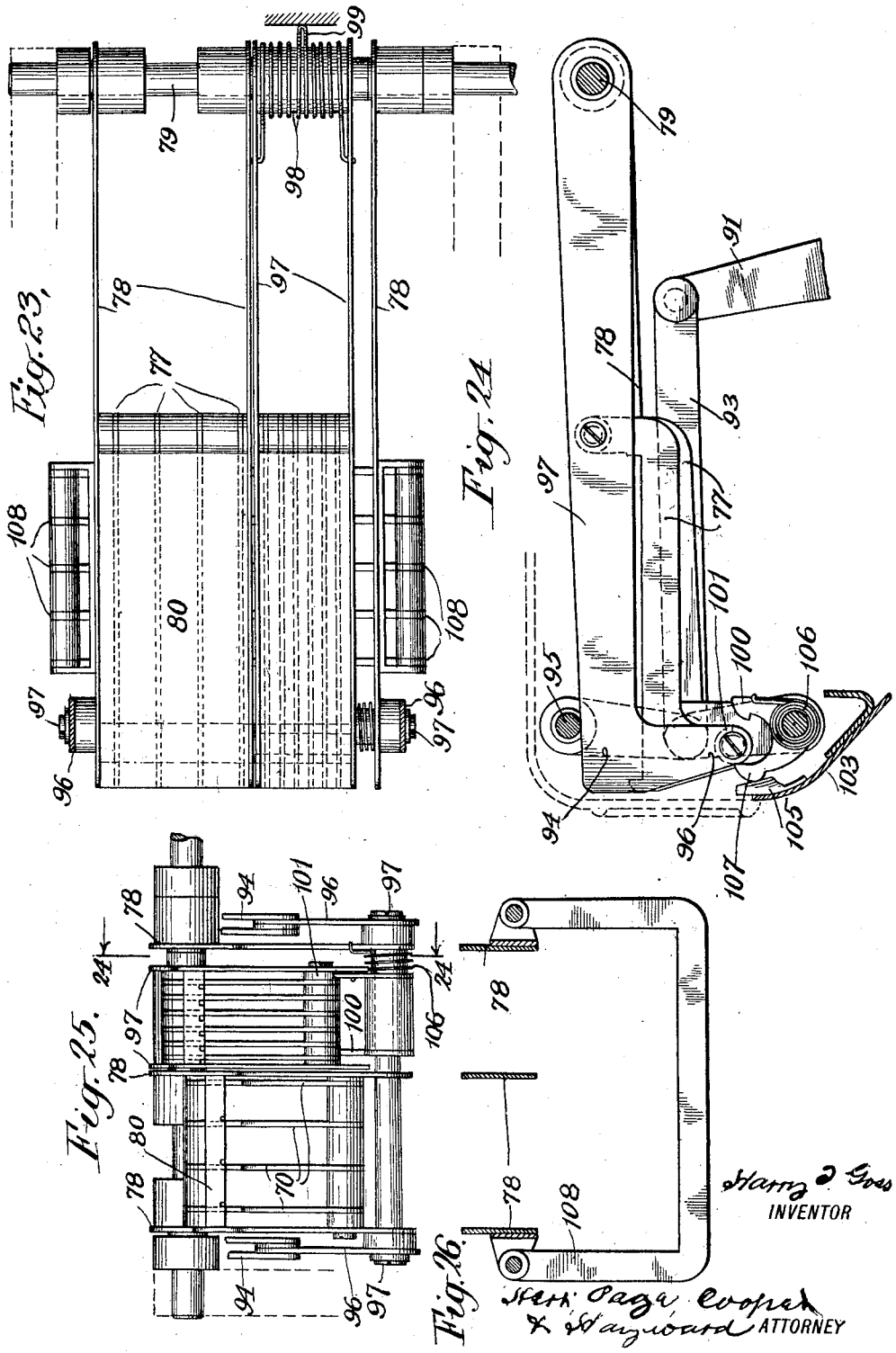

H. T. GOSS.
COUNTING AND RECORDING MECHANISM.
APPLICATION FILED OCT. 28, 1915.
1,228,315.
Patented May 29, 1917.
15 SHEETS—SHEET 14.
Fig. 27.
Fig. 28.
Fig. 29.
INVENTOR
Harry T. Goss
BY
Hatch, Paige, Cooper
& Hayward ATTORNEYS H. T. GOSS.
COUNTING AND RECORDING MECHANISM.
APPLICATION FILED OCT. 28, 1915.
1,228,315.
Patented May 29, 1917.
15 SHEETS—SHEET 15.
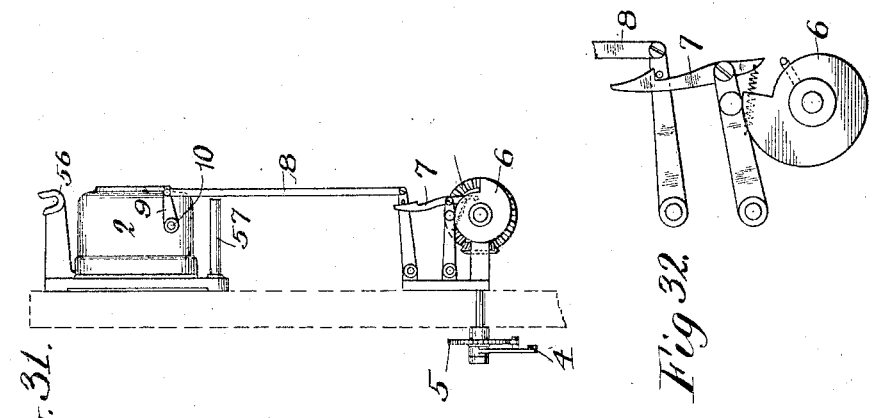
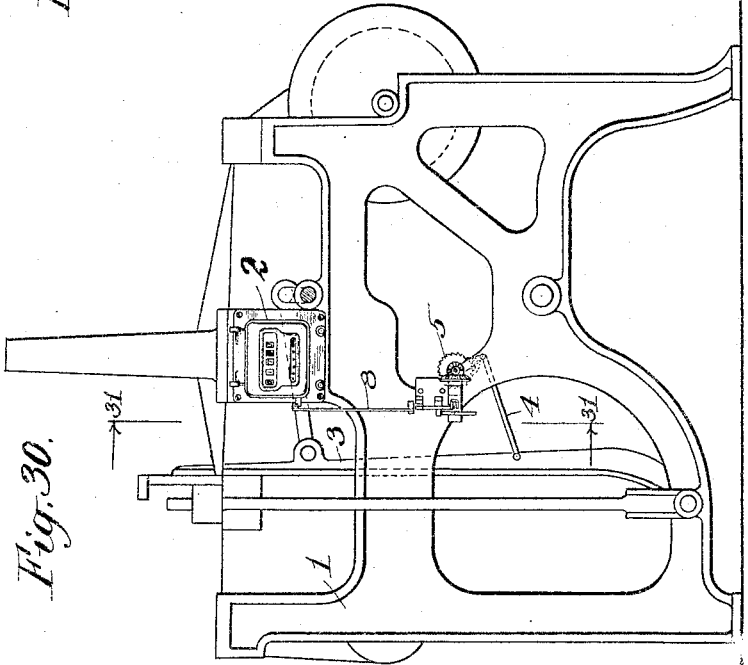
INVENTOR
Harry T. Goss
BY
Kerr Page Cooper & Hayward
ATTORNEY

UNITED STATES PATENT OFFICE.

HARRY T. GOSS, OF RUTHERFORD, NEW JERSEY, ASSIGNOR TO INTERNATIONAL TIME RECORDING COMPANY OF NEW YORK, OF ENDICOTT, NEW YORK, A CORPORATION OF NEW YORK.

COUNTING AND RECORDING MECHANISM.

1,228,315. Specification of Letters Patent. Patented May 29, 1917.

Application filed October 28, 1915. Serial No. 58,360.

*To all whom it may concern:*

Be it known that I, HARRY T. GOSS, a citizen of the United States, residing at Rutherford, in the county of Bergen and State of New Jersey, have invented certain new and useful Improvements in Counting and Recording Mechanism, of which the following is a full, clear, and exact description.

The invention upon which is based this application for Letters Patent is an improvement in machines designed for use in shops and factories for counting and recording the operations of machines of widely different character, in order to form a permanent and accurate record of what such machines have done in any given period of time. The improvement is applicable to almost any machine having movements or cycles of operation corresponding to the work performed by it. For example, a loom, which, for purposes of illustration, has been selected herein as typical of those machines to which the device is particularly applicable, has parts that move in consonance with the movements of the shuttle, and would indicate by the aggregate number of such movements in a given time how much work the loom in that time has performed, or, in other words, how much cloth it has woven.

In general terms, the invention comprises a combination of two substantially distinct mechanisms, a counter for attachment to a machine, and a recorder, preferably in the nature of a punching device, which may be temporarily attached to any of such counters and operated manually to record on a suitable card the exact condition of the counter and other data which will be referred to later.

For example, assume that on each loom in a mill one of these counters is attached and so constructed that on starting the loom into operation the attendant inserts into a specially provided hole a key of a configuration corresponding to his particular number. As the loom continues to operate its movements are recorded on the dials or disks of the counter, and at given or any predetermined intervals of time one of the office force brings to the loom the punch or recording mechanism, attaches it to the counter and turns the handle which causes it to operate those punches only which indicate the number of the loom, the number assigned to the operative and the exact condition of the counter itself; that is to say, the same number as that displayed by the relative positions of its dials or numbered disks.

I believe that such a plan, or it may perhaps better be designated a system, involves two broad features of the greatest utility and complete novelty in the art. First, it enables mill owners or others to take and record by means of a single and independent machine, the condition of any number of separate counters at any time, incidentally recording the number of the counter or machine to which it may be attached, as well as the number assigned in the mill to the operative working the machine, and, second, it records mechanically and so that there can be no errors, intentional or not, the exact condition of the counters at any instant or the exact number which is displayed thereby.

Aside from these features there are numerous other improvements in the construction, design and operation of the mechanism which I have devised, which, being of a somewhat more specific nature, may best be gathered and understood from the detailed description which follows, and in which I have made reference to the annexed drawings:

In the latter, Figure 1 is a plan view of the improved counter, showing the punching or recording mechanism temporarily attached thereto.

Fig. 2 is a view in side elevation of the same parts.

Fig. 3 is a vertical section on the line 3—3 of Fig. 4.

Fig. 4 is a face view of the counter.

Fig. 5 is a partial section on the line 5—5 of Fig. 6.

Fig. 6 is a section on line 6—6 of Fig. 7, showing the counter mechanism in elevation.

Fig. 11 is a vertical section on line 11—11 of Fig. 13 of the punch mechanism of the recorder.

Fig. 12 is a vertical section of the operating parts of the punch or recording mechanism and a counter shown in their coöperative relations.

Fig. 13 is a horizontal section on the line 13—13 of Fig. 11.

Fig. 14 is a front view of the punch mechanism with the front of the casing removed so as to show the latter in section.

Fig. 15 is a vertical section on the line 15—15 of Fig. 11.

Fig. 16 is a detailed section showing the cam for operating the punch selector rock shaft.

Fig. 17 is a detailed cross section on the line 17—17 of Fig. 11.

Fig. 18 is a detailed section showing the arm and finger which operate the shield normally closing holes in the front of the counter casing which, when opened, admit the index fingers of the punch mechanism.

Fig. 19 is a double view of the key to be inserted by the operative or workman into the counter at the time when he starts the machine to which the counter may be attached in operation.

Fig. 20 is a detailed view showing the feeding mechanism for cards to be inserted in and punched by the recording mechanism.

Fig. 21 is a plan view of a portion of the card feed mechanism.

Fig. 22 is a front view of the cam and lever which operate the card feeding mechanism.

Fig. 23 is a plan view of the punch selector supports.

Fig. 24 is a vertical section on the line 24—24 of Fig. 25.

Fig. 25 is a front view of the punch selector supports.

Fig. 26 is a detailed view of a yoke used in connection with punches for withdrawing the same from punched holes in a card.

Fig. 27 is a triple view showing the end elevations and face view of the feed pawl of the counter.

Figure 7:
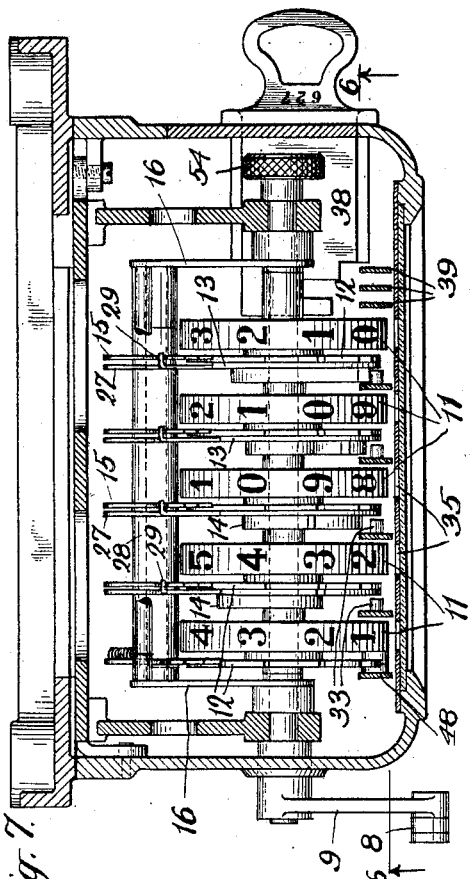
Fig. 7 is a horizontal section on line 7—7 of Fig. 3.

Fig. 28 is a view of a card after having been punched on the "in" operation, showing the holes that represent the condition of a given counter at the beginning of a given run or piece of work, the position of the holes on the card indicating the exact condition of the index wheels of the counter at that time, also the number of the counter or of the machine to which it is attached, dependent upon the character or position of the machine number slugs, and the number of key which has been inserted into such counter which represents the workman's number.

Fig. 29 is a view of the same card shown in Fig. 28 after it has been subjected to the second recording operation designed to show the extent of the performance of the same machine, and as indicated by the counter of that machine.

Fig. 30 is a partial side elevation of a loom showing the improved mechanism attached thereto.

Fig. 31 is a vertical section on the line 31—31 of Fig. 30.

Fig. 32 is a detailed view of the cam and lever forming parts of the loom which operate the counter.

It will be understood that the character of the particular machine to which the counter may be attached is in large measure immaterial, as also is the means employed in connection therewith for operating the counter. I have, however, selected a loom as typical of such machines and shown a specific but convenient attachment therefor to impart to the counter a complete unit movement for each corresponding movement of some part that corresponds, say, to the throw of a shuttle. This is illustrated in Figs. 30 to 32.

The loom is indicated by the numeral 1 and the counter attached thereto by 2. Any movable part of the loom having the characteristics above described, as the lay 3, has attached thereto a bar 4 operating a ratchet wheel 5 geared with which is the cam 6 which operates any suitable trip mechanism 7 to reciprocate a rod 8 that works the counter mechanism. The specific nature of these devices is not material to the invention.

The rod 8 is pivotally connected with a crank arm 9 on the operating shaft 10 of the counter, which, as shown, is inclosed in a suitable casing adapted for permanent attachment to the frame of the loom.

The counting mechanism, Figs. 3 to 8, comprises a series of disks 11, each with ten equally spaced units, 0 to 9, and loosely mounted on a shaft 18. With each disk except the last of the series to the left, is associated a ten tooth disk or wheel 12, a single tooth disk or wheel 13 and a cam 14, the four elements named being rigidly connected together as by a pin or pins passing through them.

For each numbered disk and its described accessories a shifting pawl 15 is employed, that is operated by the movements imparted to the crank arm 9 and shaft 10 through the following instrumentalities: Side plates 16 are mounted on the shaft 18 and are connected by a cross rod 17. A pawl 15 is mounted loosely on rod 17 over each ten tooth disk 12, but all of said pawls are normally held out of engagement with their respective disks except the one on the right which operates the ten tooth disk of the units wheel.

The rock shaft 10 has a fixed arm or arms 19 pivotally connected with links 20 pivoted to the side plates 16. Projecting from each link 20 is a stop or lug 21, which normally rests upon a bar 22 and is drawn downward upon such bar by a spiral spring 23. When, therefore, the rock shaft is moved by the crank arm an upward movement is imparted to parts 19 and 20 to the ratchet frame 16, 17, and all of the pawls 15 are raised. It will be observed that some one or more of these pawls may be in position to engage the teeth of their respective ratchet wheels while the others are raised so as to be incapable of this operation. The pawls are formed with a shoulder 24, and those which are in operative position on their forward throw are arrested by engagement of the outer surface of this shoulder with the under side of a fixed square rod 25. On the contrary, in the case of those pawls which are inoperative to shift their ratchets, the lower surface in front of the shoulder comes in contact with the underside of the square rod. The purpose of this construction is to bind the ratchet wheels and prevent their overthrow in fast operation of the machine.

The pawl which operates the units disk is held by its spring 26 in constant engagement with the ten tooth disk or wheel attached thereto, so that for every operation of the rock shaft 10 the disk is advanced one step corresponding to a complete unit. The single toothed wheel of the units disk is thus caused to make one complete revolution for each full revolution of said disk, bringing its tooth or indentation under a pawl 27, Fig. 27, which is mounted at one end of a hub 28, to the opposite end of which is fixed a pawl 15 for the second or tens disk of the counter. As shown in Figs. 7 and 27, the tail 29 of the pawl 27 lies over the first pawl or that engaging with the units disk, so that in no event may the pawl 27 drop into engagement with the single tooth of its wheel, except and during the period that the said first pawl is in engagement with one of the ten teeth in its wheel, which may be arbitrarily determined. At such time, however, the pawl 27 falls into its tooth, and this permits the second pawl 15 to engage the second or tens disk ratchet wheel, and, as all the pawls are moved by each movement of the shaft 10, such second disk will be advanced the space of one numeral. Upon the next movement of the first pawl 15 the tail of pawl 27 is raised, and as the single tooth wheel is at the same time moved one tenth of a revolution, the descent of pawl 27 to a point low enough to permit the second pawl 15 to engage with the tens disk ratchet is prevented.

When in this way the tens disk and its ten toothed wheel has made one revolution, the pawl 27 over its one toothed wheel permits the third pawl 15 to shift the hundredths disk one step, and so on. In other words, no disk can be shifted unless all of the teeth of the single tooth wheels preceding it are in line under their respective pawls, as is also a predetermined tooth in each of the preceding ten toothed wheels. The last disk of the series, which is merely a totalizing disk, obviously requires and has no single toothed wheel, as its movement is not transmitted to any other disk.

In addition to the parts described, each numbered disk except the last, has fixed to it a cam 14, see Figs. 3, 6 and 12, which, moving progressively with its disk presents at its middle or diametrical portion a surface more or less remote from its axis according to its position about such axis. Suspended from a rod 31 on which they are pivotally mounted, are levers 32, one in immediate proximity to each cam 14. These levers carry pins 33 which lie in the planes of the said cams and make contact with the edges of the same when said levers are forced back from the front of the machine. Each of said levers 32 has also a pin 34 extending at right angles therefrom near its lower or free end, and, as will be hereinafter explained, when the ends of the punch selector fingers of the recorder enter holes 36 in the casing and encounter these last named pins, the levers are forced back until the pins 33 contact with cam 14. In this way the position of each punch selector will depend upon the extent to which the corresponding lever 32 with its pins 33 and 34 is moved, which will be more or less according to the position of the respective cams 14 and the numerals on the disks displayed at the openings 35, Fig. 7.

As I have above explained, when a workman starts the machine in operation he inserts through an opening 37, Fig. 2, a key 38, which remains in the machine in the position indicated in Figs. 4, 6 and 7. This key has notches 41 of varying depths, shown more clearly in Figs. 7 and 19, which correspond to digits indicating the number of that key. Three or more levers 39 similar to levers 32 depend from the bar 31 and lie in the path normally occupied by these notches, and these levers are provided with pins 40 which are also engaged by the punch selectors, as will be set forth later, which enter the counting mechanism through an opening 42, Fig. 4, to an extent corresponding to the depth of the notches in the key into which the levers are forced, and determine the punches which are to be thereby operated.

Figure 8:
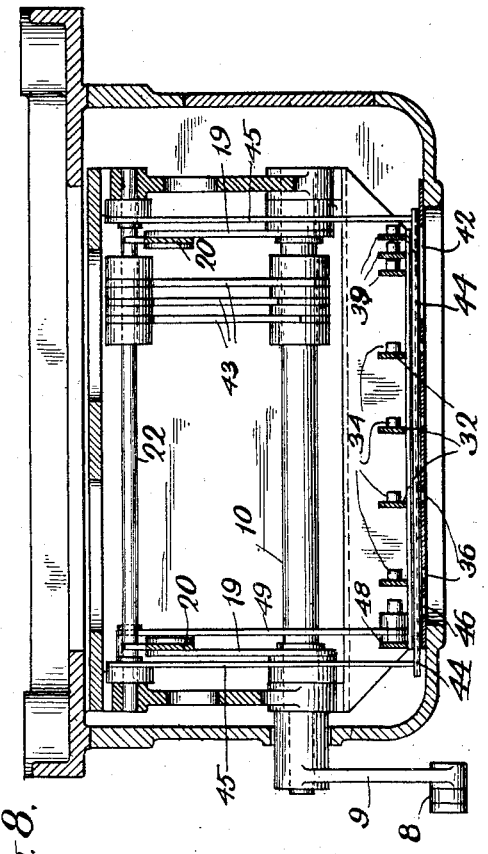
Fig. 8 is a horizontal section on the line 8—8 of Fig. 3.
Figure 10:
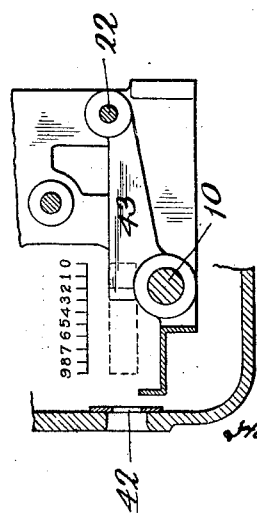
Fig. 10 is a detailed section of the index stops which coöperate with the index fingers of the recording mechanism to record or punch holes representing the number of the counter or machine to which it may be attached.

Each machine should also have a given identifying number, and for this purpose I employ a series of stops 43, Figs. 6, 8 and 10, which are slugs of different lengths that may be introduced into the machine as permanent attachments. These stops lie back of opening 42 and are designed to be encountered by punch selector fingers which are thereby permitted to move into the counting mechanism casing to an extent corresponding to the length or position of the slugs, and to thereby determine the particular punches will be operated to indicate the number corresponding to the particular group of slugs.

Figure 9:
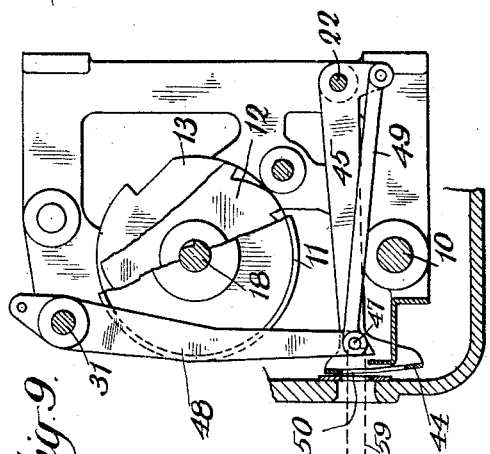
Fig. 9 is a detailed sectional view showing the release mechanism or a shield which normally covers apertures through which the index fingers of the recording mechanism are designed to pass.

Aside from the parts described, the counting mechanism, for the purpose mainly of adapting it for use with the recording or punching mechanism has other important features of construction. For example, the holes 36 are normally closed by a shield that is removed only by the connecting and operation of the recording device. This mechanism is shown in Figs. 3, 5 and 9 and comprises a shield 44 carried by a pivoted frame having side bars 45, and is normally in position to close the holes 36. When a recording device is attached to the counter and operated, however, a rod or finger 59 is forced from the same through a small hole 46 in the front of the counter, which is always open. This rod, which has a comparatively rapid movement, encounters a pin 47 at the lower end of a pivoted lever 48, which connects by a link 49 with the short arm of one of the side bars 45 formed as a bell crank lever carrying the shield. The rearward movement of lever 48 thus operates to depress the shield so that openings 50 therein come on a level with the holes 36 and open them to admit the punch selectors.

Other features of construction distinguish the counter which are largely in the nature of structural improvements. For example, in Fig. 3 there is shown a pawl 51 acted upon by a spring 52 and adapted to be engaged by a tooth 53 in the shaft 18. One of these pawls is pivoted to each of the numbered disks so that when the shaft 18 is turned backward, as by a milled head 54, shown in Figs. 6 and 7, all of the disks are turned back to the zero position and no other figures are displayed.

Again, with each ten toothed wheel 12 there is employed a spring actuated retaining pawl 55, see Fig. 3, pivoted to the frame and engaging with the teeth of said pawl to prevent movement in a backward direction. Other structural features are illustrated clearly in the drawings, and will be understood without more specific description by those skilled in the art. All of these may be varied in character.

By reference to Figs. 1, 2 and 12 it will be observed that the counter mechanism casing 2 is provided at its upper front portion with hooks 56 and below with pins or projections 57. These are to receive and afford a support for the recording mechanism which is periodically applied to the counter for the purpose above set forth, and when the recorder is attached, as shown in Fig. 2, the punch selector bars 58 lie immediately in front of the holes 36 and 42 and a starting pin or rod 59 in front of the hole 46. It is the function of the recording mechanism to first push the pin or rod 59 into the counter casing in order to shift the shield covering the holes 36 and 42, and thus to open these holes, and then to push the bars 58 through the holes thus opened to an extent determined by the position of the cams 14 into contact with which they force pins 33 on levers 32; by the character of the notches in the workman's key, and by the position or length of the machine number slugs 43, so that according to the relative positions of such fingers or bars the proper punches will be selected to punch in a card held in the recorder, holes which will indicate by their position therein the displayed numbers corresponding to the positions of the cams 14 and the numbers corresponding to the key notches and to the character of the machine number stops or slugs.

To accomplish this result the recorder is provided with a main cam or driving shaft 60 operated by a crank or handle 61. On this shaft is a cam 62 that operates when the shaft is turned to engage and shift a stud or roller 63 on the end of a bell crank lever 64 pivoted to the frame at 65 and retracted by a stout spiral spring 66. The shorter arm of this lever is formed as a toothed sector 67 of considerable width which engages with a sector 68 mounted fixedly on a shaft 69 carrying oscillating arms 70 projecting upwardly and formed as a frame by the connecting plates 71.

Pivoted on the shaft 69 is a series of levers 72, each connected by a spiral spring 73 with the plate 71 and normally resting in contact with said plate. By links 74 heads 75 are connected with the free ends of these levers, so as to be shifted by their movement. These heads 75 are provided with pins 76 that rest upon and slide along the upper edges of guide plates 77 carried by a frame with side bars 78, 78 and pivoted at 79, the heads being thereby movably supported just below and out of contact with a plate or plates 80 carried by the pivoted frame 78.

Normally the position of the parts described is as shown in Fig. 11, but when by the operation of cam 62 the frame with side bars 79 and plate 71 is thrown backward, the tendency of the springs 73 is to pull the levers forward, and draw with them the heads 75 over the guide plates 77 to some point represented, for example, in Fig. 12.

Beneath the head 75 are a series of punches 81 arranged in lines in the path of travel of the head 75, so that by the movements of the levers 72 the heads 75 will be drawn forward over such of these punches as the extent of movement of the lever 72 will determine. This movement depends upon and is controlled by the series of punch selector fingers or bars 58, one of which is connected to each lever 72 by a pin engaging in a slot in the latter, as shown at 82 in Figs. 11 and 12, and which are forced into the counter casing, as hereinbefore explained, until they are arrested by the positions of cams 14 by the key notches or by the numbering slugs. For each numbered disk, for each key notch and for each numbering slug there is a corresponding selector finger, lever 72 and head 75, so that by the operation of the parts above set forth the heads will be set over those punches which represent and correspond to the appropriate numbers. The selector fingers are supported by combs of any suitable character at two points, such supports being represented by the numerals 83 and 84.

Before the selector fingers 58 may enter the outer casing the shield covering the holes 36 must be shifted, and for this purpose I use the device shown in Fig. 18. This comprises a cam 85 on the shaft 69 which is operated by the initial movement of said shaft, by the cam 62 of Fig. 16 to rapidly throw the short arm of a bell crank lever 87 by engagement with a pin 86 thereon, and by this means to advance the long arm pivotally connected by a slot and pin 88 to the releasing finger 59 mounted in the same manner as the selector fingers 58. The finger 59 in its forward movement enters the hole 46 in the counter casing and shifts the shield, as has been already described, and opens the holes 36 for the subsequent admission of the punch selector fingers.

When this operation has been performed and the heads 75 have been duly and properly positioned over the punches, a cam 89 on the shaft 60 operates to throw a pin 90 on the end of one part of a bell crank lever 91 pivoted at 92. The other arm of this lever 91 is connected by a link 93 with a toggle, one member of which, 94, is pivoted to the frame at 95 and the other, 96, is pivoted at 97 to a part of the frame 78. The movement imparted to lever 91 by the cam 89 operates to straighten the two toggle elements and so to depress the frame 78 and plates 80 and thus to force the heads 75 down upon the punches. Again referring to the Figs. 11 and 12, the former shows the machine in the normal condition in which it is to be attached to a counter, and the latter shows it in the condition to which it is brought for punching the holes that represent by their position in the card the condition of the counter.

Having thus described the main features of the apparatus for counting and for recording the count, it remains to indicate the subsidiary improvements which distinguish the recording mechanism, among which is the means for throwing out of operation the punches that indicate the key and the machine numbers when the recorder is attached for the second or subsequent time to a machine from which the "in" or starting record has already been taken. The mechanism for this purpose is illustrated chiefly in Figs. 11, 14, 17, 23, 24 and 25.

The main frame 78 which carries the heads 75 is in fact composed of two frames, the first having three side bars 78 and the other two side bars 97 independently carried by a hub 98 on the shaft 79 and connected to the main frame by a spiral spring 99. Normally by means of a latch or pawl 100, Fig. 11, this secondary frame is positively locked to the main frame by the engagement between such pawl and a tooth mounted on supporting bar 101. When the recorder is first applied to a counter to take the starting or "in" record an index handle 102 on the front of the machine is turned to the position indicated in Fig. 17. The lower end of the handle or pointer lever 102 is connected to a sliding plate 103 attached to the frame by pins 104 working in slots, and shifts said plate so as to bring a cam 105 at the end thereof into the position indicated in Figs. 11 and 13.

The pawl or latch 100, by means of a spring 106 coiled about its axis, is normally held in engagement with the tooth or notch mounted on support 101, but the pawl has a tail piece 107 extending up on the opposite side of support 101, which, when pushed to the right, carries the latch or pawl with it and disengages it from 101, thus freeing the secondary frame 97 from its former rigid connection with the main frame.

Accordingly in the recording of the "out" record of the counter the index handle 102 is turned to the left or until it points to "out," which shifts the plate 103 to the right, brings the cam 105 into engagement with the tail piece 107 and throws the latching pawl into the position shown in Fig. 24 out of engagement with the notch or tooth mounted on 101. When by the subsequent operation of the toggle the plate 80 forming part of the main frame is depressed over the heads 75 the secondary frame and its plate is not depressed and the punches under it are not operated to punch holes in the card. This is obviously desirable, as the card punched is the same card used on the "in" operation and bears already the key and machine numbers.

It is obvious that when another card is to be punched for an "in" record, the index handle 102 is again turned to the right, which causes the reëngagement of the frames and the operation of all the punches.

In order to insure the proper separation of the punches and the card through which they have passed, and the raising of the punches to the positions from which they should be again depressed by the heads 75, there are secured to the side bars 78, as shown in Fig. 26, yokes 108 which, as shown in Fig. 11, pass between pairs of punches immediately below shoulders 109 formed thereon. When the frame or side bars 78, therefore, rise, these yokes engage with the depressed punches and lift them out of the paper and back to normal position.

The recorder is provided with a card tray or receiver 110, Fig. 1, into which a card to be punched is deposited. Beneath this receiver is a rectangular frame with side bars or plates of sheet metal 111 adapted to slide from front to rear on bars 112. Each side plate 111 is provided with teeth 113, see Figs. 20 and 21, to form racks that engage with pinions 114 on a rotary cross bar 115.

On the main shaft 60 is a cam 116 that in its revolution encounters a pin or stud 117 on the short arm of a bell crank lever 118, the longer arm of which is connected by a link 119 with the short arm of the bell crank lever 120, the long arm of which is connected by a link to a stud 121 secured to one of the side plates 111.

The first effect of turning the main crank shaft is, therefore, to rapidly shift the frame backward under the card receiver, an even movement being secured by the pinions on rod 115 which engage with the two side bars of the frame.

Attached to the front of the frame comprising the side plates 111 is a plate 124 with two upwardly extending projections or arms 122, Figs. 11, 14, 17, 20 and 21, from which extend horizontally and rearwardly strips or fingers 123 with Z-shaped ends 124$^a$. The upper ends of projections 122 extend above the level of these fingers so that when a card is laid in the receiver it lies between the said Z-shaped ends and the overhanging ends of the projections or arms 122 and is drawn by the latter into the machine under the punches 81 and over the perforated bed plate 125. To permit such movement the bed of the card receiver is composed of a flat central stationary plate 127 and two side plates 126 riveted to the sliding part 103 and having upturned edges which afford side guides for the card. A wide slot or space is left at the left between plates 126 and 127, and a narrower space at the right, through which the projections or arms and fingers attached thereto travel with the card.

The above description applies to the condition of the parts on the "in" or starting operation of the punch mechanism, but when the second or "out" record is to be produced, the index handle 102 is turned to the left, which thereby throws the plate 103 to the right. As the side plates 126 are riveted to the plate 103, they also are shifted to the right carrying with them the card transversely for the proper distance to bring the columns for the "out" figures or punch holes in the card under the lines of punches.

In the forward movement of the projections 122 and fingers 123 the latter pass through guide openings or channels 128 (Fig. 15) formed to receive them between the stripper plate 129 and the punch plate 125, but as the card in its final position is or may be beyond the confining edges of plate 126, and on being withdrawn might be liable to become laterally displaced and to catch on the upturned edges, each plate 126 is provided with an extension or finger 130, shown in Fig. 13 and also in section in Fig. 15, which pass into wide slots or guide ways 131 between the punch and stripper plates. These fingers form side guides for the card after it has passed from between the upturned edges of plates 126.

In Figs. 14 and 15 I have shown as a part of the recorder casing a receptacle 132 for cards either before or after punching, and this forms a convenient means of carrying a supply of cards for use with the machine.

At the risk of repetition, but with a view to a complete and accurate understanding of this invention, we now refer to Figs. 28 and 29. These figures represent the cards in their condition after the first or "in" and after the second or "out" punching. A card, as 133, is inserted as above explained in the tray and carried into the machine under the punches for the first record. By the operation of the recorder when attached to any given counter holes punched in the second, fourth, sixth and eighth columns represent the condition of the counter at starting. Let us assume that this indicates 1789.

At the same time, in the three columns appropriately marked, three or more figures will be punched, say 203, which indicate the number of the machine to which the particular counter is attached, and in the last three or more columns will be punched say the number 627, which indicates the operative or workman whose key was inserted in the counter. On the second or "out" operation, no further punches in the last six columns will occur, but holes will be punched in the first, third, fifth and seventh columns which will correspond, say, to the number 2265, which represents the then condition of the counter.

This card may then be filled out by hand or inserted in a proper machine for making any desired calculations from the record which it bears, or tabulating the results deducible from the same.

The preferred form of recorder for the purpose above outlined, is one which makes its records by means of holes which it punches in a card, but this it will be understood is not essential, as any equivalent form of device operating in the same way to produce a like result may be substituted for the punches.

I have devised in part and utilized old devices in part for carrying out the objects of this invention, but I do not understand that in the obtaining of these objects I am limited to the specific mechanism which I have shown and described. The main features of novelty in what I have accomplished reside in the operations performed rather than in the means employed to perform them, and these latter may therefore be very widely varied without departure from the real invention.

The constructive features of the recording mechanism I have not claimed in this application, reserving the right to make such claims in another application.

What I claim is:

1. The combination with a counter permanently associated with a machine for recording its operations, of a separable recorder adapted for temporary connection with such counter, parts or elements in the counter movable to positions which correspond to the record which it has made, coöperating parts or elements in the recorder and means for moving them to extents determined by the corresponding parts in the counter, and means for registering such movements and obtaining thereby a record which corresponds to the number displayed by the counter.

2. The combination with a counter permanently associated with a machine for recording its operations, of a separable recorder adapted for temporary connection with the counter, parts in the counter movable to positions corresponding to the record which it has made, coöperating parts in the recorder and means carried by the recorder for moving such parts into positions corresponding with those in the counter, registering or recording such movements and obtaining thereby a record which corresponds to the number displayed by the counter.

3. The combination with a counter permanently associated with a machine, numbered disks therein which by their positions indicate the operations of such machine, and parts movable with the disks to positions corresponding to the numbers displayed, of a separable recording instrument adapted to be connected in coöperative relation to such counter and means therein for moving its registering devices to extents determined by the positions of the movable parts of the counter and producing a record of such movements which corresponds to the numbers displayed by the counter.

4. The combination with a counter attached to a machine, numbered disks therein which by their positions indicate the operations of such machine, and cams movable with such disks, points on which indicate by their distance from the axes of the cams the numbers displayed by the disks, of a separable recorder adapted for temporary connection with such a counter, selectors therein, means for moving the same into contact with the indicating points on the cams, and recording devices controlled by the selectors for recording the positions of the cams and indicating thereby the numbers displayed by the counter disks.

5. The combination of a counter permanently associated with a machine, disks therein which by their positions display numbers indicating the operations of the machine, and cams connected with said disks with points thereon, the distance of which from the axes of the cams corresponds with the numbers displayed, of a separable self contained recording mechanism, movable selective fingers therein, and means for moving the same, when the recorder is attached to the counter into contact with the indicating points on the counter cams, and recording devices controlled by the selective fingers to produce a record of the positions of such fingers, and of the corresponding numbers displayed by the counter disks.

6. The combination with a counter adapted for attachment to a machine, numbered disks therein, which by their position display numbers indicating the operations of the machine, and cams movable with such disks and having points thereon which by their positions with relation to a fixed plane correspond to such numbers, a recorder adapted to be operatively connected with the counter, punch selector fingers movable through distances corresponding to the positions of the cams, punches operated by such selectors and means for moving the selectors and operating the punches.

7. The combination with a counter attached to a machine for recording the operations of the same, parts therein which move to positions corresponding to the record made, and indicating by their position the amount of work done by the machine, of a separable self contained recorder adapted to be temporarily attached to said counter, punch selector fingers therein, means for moving the said fingers to engage the movable parts of the counter, and determining by the extent of their movement the punches to be operated, and means for operating the said punches to obtain a record corresponding to that made by the counter.

8. The combination with a counter associated with a machine for indicating the operations of the same, and comprising parts movable to positions corresponding to the conditions of the registering mechanism thereof of a separable card punching recorder, adapted for temporary attachment to the counter, punches therein whose operation is dependent upon the position of the movable parts of the counter, and manually operated means for operating the punches.

9. The combination with a counter associated with a machine for indicating its operations, a registry train and a series of cams therein the movements and positions of which correspond to those of the said train, of a separable card punching recorder adapted for coöperative connection with the counter for producing records corresponding to the positions of said cams and indicating by the punched holes the condition of the registering train of the counter.

10. The combination with a counter comprising a registry train of wheels, and a cam attached to each wheel and indicating by its position that of said wheel, of a card punching recorder adapted for temporary attachment to the counter, selective means therein, means for moving the same to positions determined by the positions of the cams, and punches controlled in their operation by said selective means.

11. The combination with a counter associated with a machine for indicating its operations, and comprising a registry train, cams, the positions of which correspond to those of the members of said train, and a series of slugs or abutments at different points within the counter casing, of a separable card punching recorder, means for temporarily attaching the same to the counter, selector means in the recorder movable to positions in the counter corresponding to the positions of the cams for indicating the conditions of the counter and to the positions of the slugs for indicating the number of the counter.

12. The combination with a counter associated with a machine for indicating its operations, and comprising a registry train, cams, the positions of which correspond to those of the members of said train, slugs or abutments at different points or positions within the casing to indicate the number of the counter and a receptacle for a key having notches of different character for indicating a workman's number, of a card punching recorder adapted for temporary attachment to the counter, and selective means therein adapted to be moved to positions determined by the cams, the slugs and the key notches and punches controlled in their operation by the same whereby records of the condition and number of the counter and of the key inserted therein may be obtained.

13. The combination with a counter adapted to register the number of operations of a given machine and having parts, the position of which corresponds to the number registered, of a separable recorder adapted for coöperative attachment to the counter and means for changing the position therein of the record card for receiving a record of the condition of the counter on different portions of the card at different applications of operations of the recorder.

14. The combination in a counter, of a registering train and parts which occupy different positions according to the positions of the members of the registering train, a casing for the train having apertures for admitting the selective members of a recording mechanism to extents depending upon the positions of the movable parts, a shield normally covering and closing said apertures and means for shifting the position of said shield to open the apertures adapted to be operated by a finger or rod introduced into the counter casing through a constantly open hole.

15. In a counter, the combination with a train of numbered disks, a cam secured to each disk and indicating by its position the number displayed by the disk, a series of levers pivoted in proximity to the cams and extending into paths provided for the entrance into the counter casing of the selective members of a separable recorder, whereby the levers will be forced into engagement with the cams by the engagement with them of the selective members and limit the extent to which said members may be forced into the casing.

In testimony whereof I affix my signature.

HARRY T. GOSS.

Copies of this patent may be obtained for five cents each, by addressing the "Commissioner of Patents, Washington, D. C."